July 21, 1964
C. L. GARRISON
3,141,678
CHUCK CONSTRUCTION
Filed Jan. 11, 1962
3 Sheets-Sheet 1
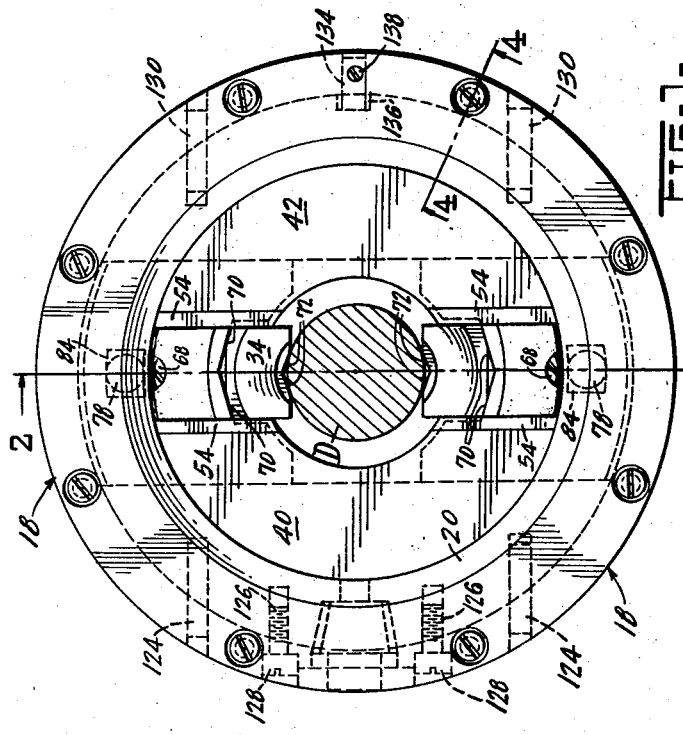
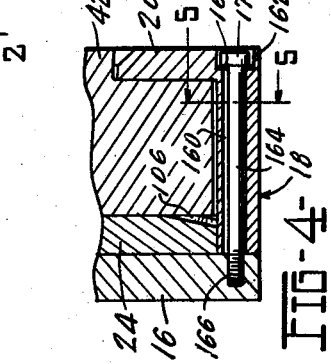
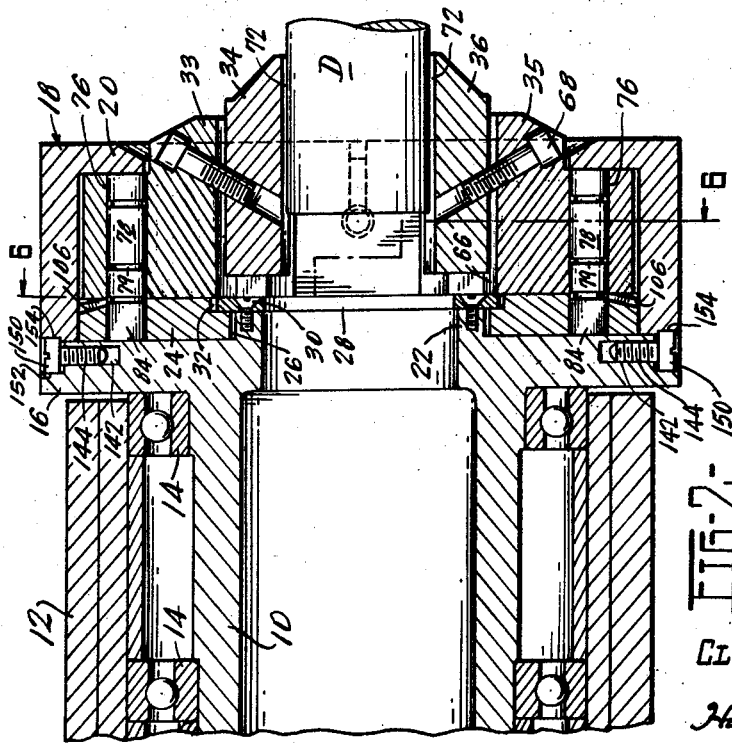
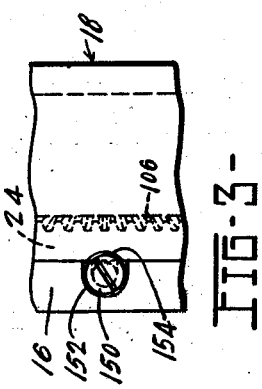
INVENTOR:
CLIFFORD L. GARRISON.
BY
Harry O. Ernsberger
ATTORNEY

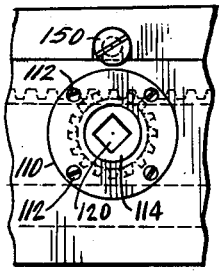

July 21, 1964   C. L. GARRISON   3,141,678
CHUCK CONSTRUCTION
Filed Jan. 11, 1962   3 Sheets-Sheet 3
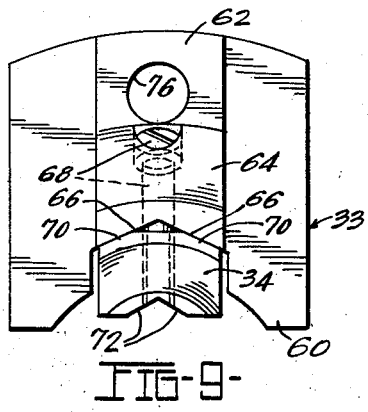
FIG-9-
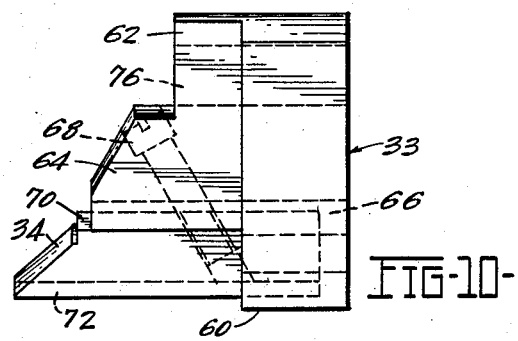
FIG-10-
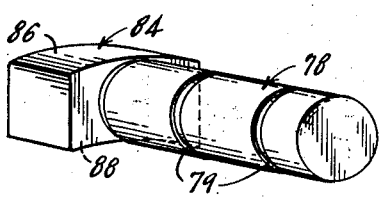
FIG-14-
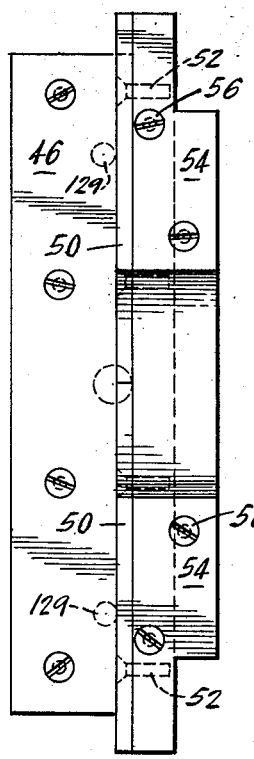
FIG-12-
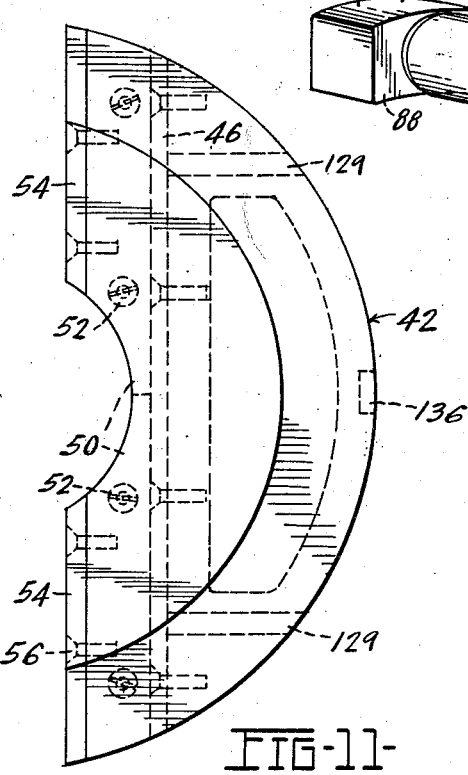
FIG-11-
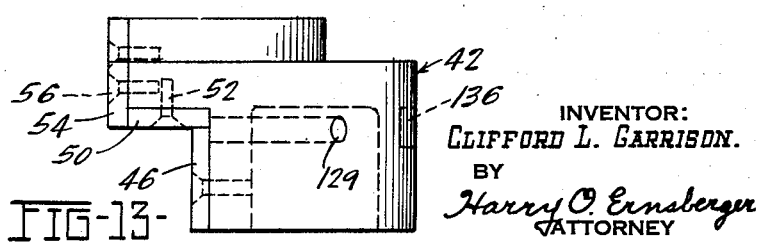
FIG-13-
INVENTOR:
CLIFFORD L. GARRISON.
BY
Harry O. Ernsberger
ATTORNEY United States Patent Office 3,141,678
Patented July 21, 1964

3,141,678
CHUCK CONSTRUCTION
Clifford L. Garrison, Adrian, Mich., assignor to Oliver Instrument Company, Adrian, Mich., a corporation of Michigan
Filed Jan. 11, 1962, Ser. No. 165,508
9 Claims. (Cl. 279—114)

This invention relates to chuck construction and more especially to a heavy duty type chuck construction incorporating adjustable jaws and means operable for simultaneously adjusting the jaws.

An object of the invention resides in the provision of a chuck construction embodying adjustable jaws and incorporating adjusting means whereby the jaws are simultaneously accurately adjusted toward or away from an axis of rotation, the adjusting means being of a character whereby a minimum of wear occurs on the operating components.

Another object of the invention resides in a chuck construction embodying adjustable jaws which are slidably arranged within ways, tracks or guides embodying means for compensating for wear of the jaws and for adjusting the chuck construction with respect to a chuck supporting shaft whereby the chuck jaws properly align the axis of rotation of the work carried by the chuck with the axis of the supporting shaft.

Another object of the invention resides in a heavy duty chuck construction especially adapted to holding large diameter drills for grinding the same wherein the jaws of the chuck are rendered adjustable by means cooperating with scroll-like slots whereby the jaws may be adjusted simultaneously to maintain the workpiece or drill in centered relation in the chuck.

Another object of the invention resides in a chuck construction embodying means for adjusting components of the chuck construction to eliminate lost motion and to compensate for any wear that may take place between the chuck jaw carriers and the guide means therefor.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of the chuck construction of the invention;

FIGURE 2 is a sectional view through the chuck construction, the view being taken substantially on the line 2—2 of FIGURE 1;

FIGURE 3 is a fragmentary plan view of a peripheral portion of the head or housing construction of the chuck;

FIGURE 4 is a detail sectional view taken substantially on the line 4—4 of FIGURE 1;

FIGURE 5 is a detail sectional view taken substantially on the line 5—5 of FIGURE 4;

FIGURE 6 is a transverse sectional view taken substantially on the line 6—6 of FIGURE 2;

FIGURE 7 is a transverse sectional view taken substantially on the line 7—7 of FIGURE 6;

FIGURE 8 is a fragmentary elevational view of a portion of the construction illustrated in FIGURE 7;

FIGURE 9 is an end view of one of the chuck jaws and work-engaging insert;

FIGURE 10 is a side elevational view of the chuck jaw and work-engaging insert shown in FIGURE 9;

FIGURE 11 is an end elevational view of one of the guide components for the movable chuck jaws;

FIGURE 12 is a side elevational view of the construction shown in FIGURE 11;

FIGURE 13 is a plan view of the construction shown in FIGURES 11 and 12, and

FIGURE 14 is an isometric view of one of the components of the chuck construction.

Referring to the drawings in detail, the chuck construction illustrated is supported or mounted by a hollow shaft or tubular arbor 10 which is journally supported for rotation upon a frame 12 by means of anti-friction or ball bearings 14.

The frame or support 12 may be a component of a tool grinder as, for example, a drill grinder as the chuck construction is especially adaptable for supporting drills or other workpieces to be ground, or the chuck construction may be used with other machine tools. The hollow shaft 10 is provided with a circular flange 16 which forms a carrier or backing plate for the components of the chuck construction.

The chuck construction is inclusive of a cup-shaped circular housing or head 18 formed with an inwardly extending circular flange 20. The supporting shaft 10 is provided with a circular tenon 22. Disposed adjacent the frontal surface or face of the flange 16 is an annularly shaped plate or disc 24, referred to herein as a scroll plate, which is rotatable relative to the tenon 22. An annular clearance space 26 is provided between the inner circular edge surface of the plate 24 and the tenon 22 to facilitate adjustment of the plate 24 and other components in a manner hereinafter described.

The periphery of the scroll plate 24 is snugly, yet rotatably, fitted into the housing 18 in order to maintain the chuck jaws in proper relation.

The plate 24 is formed with a circular recess to accommodate a retainer plate or member 28 which is secured to the tenon by screws 30 to maintain the scroll plate 24 in adjacent relation to the flange or backing plate 16. An annular clearance space 32 is provided between the exterior periphery of the retainer plate 28 and the adjacent wall of the recess in plate 24 to accommodate adjustment of the plate 24.

In the embodiment illustrated, the chuck construction is inclusive of two chuck jaws 33 and 35, the jaw constructions being of identical shape and being illustrated in detail in FIGURES 9 and 10. The chuck jaws 33 and 35 support removable work-engaging inserts or blocks 34 and 36. The chuck jaws 33 and 35 are slidable relative to chuck cheek or guide members 40 and 42, the chuck cheek 42 being shown in detail in FIGURES 11, 12 and 13. Secured to the member 40 is a guide plate 44, and secured to the member 42 is a guide plate 46.

The plates 44 and 46 are preferably of hardened metal and the chuck jaws 33 and 35 are slidable in opposed directions, their paths of movement being defined by the plates 44 and 46. As particularly shown in FIGURE 7, hardened metal plates 50 are arranged to provide guide surfaces for the chuck constructions, the plate being secured in position by screws 52 extending into threaded openings formed in the members 40 and 42. Guide plates 54 for the chuck constructions are secured to the members 40 and 42 by means of screws 56.

Each chuck jaw construction 33, 35 is of a character shown in FIGURES 9 and 10 and includes a body portion 60, a forwardly extending central portion 62 of lesser width and a portion 64 extending forwardly of portion 62, the portions 62 and 64 forming means for receiving and supporting the work-engaging inserts or blocks 34 and 36. As shown in FIGURE 9, convergingly arranged surfaces 66 are formed in the face of each chuck jaw, the surfaces 66 being of equal angularity with respect to a place lengthwise through the central region of the chuck to effect a centering or proper positioning of the chuck jaw inserts.

The chuck jaw inserts 34 and 36 are removably secured to the chuck jaw supports provided by portions 62 and 64. As shown in FIGURES 1, 2, 9 and 10, each chuck jaw insert 34 and 36 is secured to its support by means of an angularly arranged threaded member or cap screw 68. In this manner, the chuck jaws may be quickly removed and replaced by simply removing the screws 68. Each of the work-engaging inserts 34 and 36 is provided with angular surfaces 70 which engage the angular surface 66 as shown in FIGURE 9 to properly center the inserts. The work-engaging regions of the inserts 34 and 36 comprise convergently arranged surfaces 72 which engage a workpiece D in the manner shown in FIGURES 1 and 2.

Means is provided having operative connection with the chuck jaws or members 33 and 35 and the rotatable plate or member 24 for simultaneously moving the chuck jaws 33 and 35 and the work-engaging blocks or inserts 34 and 36 toward or away from each other to engage or disengage the inserts with a workpiece. Each chuck jaw 33 and 35 is fashioned with a bore 76 to accommodate a cylindrically shaped member or pin 78 shown in FIGURE 14. The pins 78 are of a dimension to snugly yet rotatably fit within the bores 76 without appreciable lost motion.

As shown in FIGURE 6, the plate 24 is fashioned with two scroll-like slots 80 and 82. Formed at one end of each of the pins or members 78 is a generally rectangularly shaped head or follower 84 having upper and lower curved surface areas 86 and 88 which are of a curvature to fit the curved walls 90 and 92 defining the scroll slots 80 and 82. The curved surfaces 90 and 92 of the slot 80 are generated about an axis 94 shown in FIGURE 6, and the curved surfaces 90 and 92 of the scroll slot 82 are generated about an axis designated 96 in FIGURE 6.

The axes of generation 94 and 96 are diametrically arranged with respect to the axis 98 of the chuck construction and are spaced equally from this axis. As the head or follower 84 formed on each of the cylindrical members or pins 78 extend respectively into the scroll slots 80 and 82, rotation of the scroll plate 24 will effect simultaneous and equal radial movements of the chuck jaws as the scroll slots 80 and 82 are of identical shape.

FIGURE 7 illustrates means for rotating the scroll plate 24 relative to the flange or backing plate 16 and the housing 18. The segmentally-shaped member or chuck cheek 40 is provided with a bore 100 to accommodate a stub shaft 102 which is secured to or forms an integral part of a miter pinion 104. The peripheral region of one face of the scroll plate 24 is formed with teeth 106 of a shape to mesh with the teeth of the pinion 104. The housing 18, at the region of the pinion 104, is formed with a recess accommodating a circular fitting 110, shown in FIGURES 7 and 8, which is secured to the housing by means of screws 112.

The pinion construction 104 is formed with a tenon portion 114 which is received in a bore 116 formed in the fitting 110. A sealing gasket 118 is disposed in a recess formed in the fitting and surrounding the tenon 114 to prevent leakage of lubricant along the tenon 114. The shaft or tenon 114 is formed with a polygonally shaped recess or well 120, which, in the embodiment illustrated, is of square cross-section to receive a key or suitable tool (not shown) for rotating the pinion 104 and hence effecting rotation of the member 24 through the medium of the teeth 106 enmeshed with the teeth of the pinion 104.

As the pins 78 carried by the chuck jaw constructions 33 and 35 have the head portions 84 extending into the scroll slots 80 and 82 in plate 24, rotation of the plate 24 causes radial movement of the chuck jaw constructions 33 and 35 and the chuck jaw inserts 34 and 36 to be moved toward or away from each other simultaneously through equal radial distances, the direction of movement being dependent upon the direction of rotation of the pinion 104.

The surface regions of the chuck jaws or members 33 and 35, in slidable engagement with the wear plates, may be formed with lubricant channels or grooves for lubricating the contacting surfaces. Each of the pins 78 may be formed with a circumferential groove 79 to accommodate lubricant as there is slight relative rotational movement of the pins 78 with respect to the chuck jaws 33 and 35 during rotation of the scroll plate 24.

The segmentally shaped member or chuck cheek 40, which provides a carrier for the guide plates at one side of the chuck jaws 33 and 35 is arranged to be fixedly secured to the housing 18. The member 40 and the housing 18 are bored with registering openings to receive dowel pins 124 for positively positioning the member 40 with respect to the chuck jaws 33 and 35. The member 40 is provided with threaded openings to receive threaded members or bolts 126, the housing 18 being formed with counterbores to receive the heads 128 of the threaded members 126 which securely fasten the member 40 to the housing 18.

The member or chuck cheek 42, shown in detail in FIGURES 11, 12 and 13, is of segmental shape and supports the wear plates 46, 50 and 54 at the opposite sides of the chuck jaws 33 and 35. The chuck cheek 42 is mounted for adjustment in a direction normal to the direction of movement of the chuck jaws and work-engaging blocks. The member 42 and the housing 18 are provided with registering bores or openings to accommodate dowel pins 130. The bores 129 in the member 42 receiving the dowel pins 130 are of a size to snugly yet slidably accommodate the dowels to facilitate adjustment of the member 42 toward the chuck jaws 33 and 35 to compensate for wear and eliminate lost motion between the guide plates and the chuck jaws.

The housing 18 is provided with a threaded bore to accommodate a threaded adjusting screw 134 as shown in FIGURES 1 and 6.

The curved peripheral region of the member 42 is provided with a notch or recess 136 which accommodates the inner end of the adjoining screw 134. As shown in FIGURES 1 and 7, the housing 18 is provided with a threaded bore to receive a setscrew 138 which may be drawn up into contact with the adjusting screw 134 to hold the adjusting screw in adjusted position.

Means is provided for adjusting the housing 18 and the components carried thereby including the scroll plate 24, chuck jaws 33 and 35 and work-engaging inserts 34 and 36 to center the chuck jaws with respect to the axis of the hollow shaft or mandrel 10 so that the workpiece D, when clamped by the inserts 34 and 36, will rotate about the axis of rotation of the shaft 10. Means is provided for locking the assemblage in adjusted position to the backing plate or flange 16 integrally formed on or carried by the hollow shaft 10.

As shown in FIGURES 2, 3, 7 and 8, the periphery of the backing plate 16 is fashioned with four threaded bores 142 arranged 90 degrees apart which are adapted to accommodate threaded members or screws 144, each screw being provided with a head 150. The peripheral region of the backing plate or flange 16 is formed with partial counterbores 152, and the adjacent edge regions of the housing 18 have recesses 154 as shown in FIGURES 3, 7 and 8. The counterbores 152 are of a depth such that the screws 144 may be adjusted in both directions a limited distance without the heads 150 bottoming in the counterbores 152.

The recesses 154 in the edge regions of the housing 18 are of lesser depth than the counterbores 152 so that the bottom of each recess 154 forms a ledge or abutment engaged by the screw heads 150. By manipulating the four screws 144, the housing 18 and the components of the chuck carried thereby may be universally adjusted in any direction and thereby enable the adjustment of the axis of the workpiece carried by the jaw inserts 34 and 36 to be aligned with the axis of rotation of the hollow shaft 10.

After the adjustment hereinabove described is made, the assemblage of components is securely locked to the backing plate or flange 16. Referring particularly to FIGURES 1, 4 and 5, the housing 18 is provided with bores 160 circumferentially spaced about the peripheral region and extending parallel with the axis of rotation of the chuck. Each bore is provided with a counterbore 162 at the entrance thereof.

Bolts 164 are adapted to extend through the bores 160, the threaded portions 166 of each of the bolts engaging in a threaded bore formed in the backing plate or flange 16. Each counterbore 162 accommodates a washer 168 and a bolt head 170. The bores 160 and the counterbores 162 are of greater diameter respectively than the bolts 164 and the washers 168 so as to facilitate adjustment of the housing 18 and components carried thereby through manipulation of the screws 144.

When it is desired to adjust the housing 18 and components carried thereby with respect to the backing plate or flange 16 all of the securing bolts 164 are loosened so as to enable the adjustment of the housing and its associated components by manipulation of the screws 144. After the proper adjustment has been made by the screws 144, the bolts 164 are drawn up so as to secure the housing 18 and the components of the chuck in a predetermined relation to the backing plate 16 as determined by the relative position of the adjusting screws 144.

In the operation of the chuck construction of the invention, the hollow supporting shaft 10 is driven by a suitable conventional means, such as a motor (not shown). With the chuck at rest, the operator inserts a suitable tool into the polygonally-shaped recess 120 in the shaft 114 of the pinion construction 104 and rotates the same to effect rotation of the scroll plate 24 through enmeshment of the teeth 106 with the teeth of the pinion 104. The scroll slots 80 and 82 effect radial movement of the pins or members 78 through engagement of the head portions 84 with the walls of the scroll slots.

The radial movements of the pins 78 effect radial movement of the chuck jaws 33 and 35 along the wear plates shown in FIGURES 6 and 7 to bring the work-engaging inserts 34 and 36 into engagement with the workpiece D or to release the chuck jaws from the workpiece. The direction of movement of the chuck jaws is dependent upon the direction of rotation of the pinion 104 and the scroll plate 24.

The work-engaging blocks or inserts 34 and 36 may be removed and replaced with other inserts or blocks simply by removing the securing screws 68 shown in FIGURES 2, 9 and 10.

If any looseness ensues through wear of the surfaces of the chuck jaws 33 and 35 or the guide or wear plates, adjustment of the member 42 may be made by manipulating the screw 134 to eliminate looseness or lost motion.

If it becomes necessary to recenter the chuck jaws about the axis of the suporting shaft 10, the securing bolts 164 are released and the four screws 144 manipulated as hereinbefore described in order to adjust the housing 18 and the components of the chuck carried thereby until the center of rotation of the work carried by the chuck coincides with the axis of rotation of the shaft 10. The securing or locking bolts 164 are then drawn up to hold the components of the chuck in adjusted position.

It is to be understood that work-engaging blocks or inserts of other shapes than that illustrated herein may be inserted in the chuck jaws 33 and 35 depending upon the character of the work to be supported or mounted by the chuck jaws.

It is apparent that, within the scope of the invention, modifications and different arrangements may be made other than as herein disclosed, and the present disclosure is illustrative merely, the invention comprehending all variations thereof.

I claim:

1. A chuck construction of the character disclosed, in combination, an annular housing, a backing plate, a pair of diametrically arranged chuck jaws, guide means for said chuck jaws in said housing, means for adjusting the position of at least one of said guide means relative to the housing, a chuck jaw adjusting plate disposed adjacent the backing plate formed with a pair of scroll-like slots, means carried by the chuck jaws extending into the slots in the adjusting plate, means for effecting rotation of the adjusting plate relative to the backing plate for moving said chuck jaws simultaneously in diametrically opposed directions, and means for adjusting the housing relative to the backing plate.

2. A chuck construction of the character disclosed, in combination, a rotatable member having a flange forming a backing plate, a housing, a pair of diametrically arranged chuck jaws, guide members for the chuck jaws disposed within and supported by the housing, means for adjusting at least one of said guide members with respect to the housing, a chuck jaw adjusting plate in said housing formed with a pair of scroll-like slots generated about spaced axis, means carried by said chuck jaws and extending into the slots in said chuck jaw adjusting plate arranged whereby rotation of the adjusting plate moves said chuck jaws along the guide members, means accessible exteriorly of the housing for effecting relative rotation of the adjusting plate, means including a plurality of elements spaced circumferentially at the peripheral region of the backing plate for adjusting the housing laterally relative to the backing plate, and means engageable with the housing and backing plate for locking the housing to the backing plate.

3. A chuck construction of the character disclosed, in combination, a rotatable shaft formed with a backing plate, a circular housing, means for adjusting the position of said housing laterally with respect to the backing plate, means for securing the housing in adjusted position to the backing plate, a pair of diametrically arranged chuck jaws, guide means for said chuck jaws supported by the housing, a chuck jaw adjusting plate arranged for rotative movement relative to the backing plate, means for rotating the adjusting plate relative to the backing plate and the housing, said adjusting plate being formed with pairs of scroll-like surfaces generated about axes spaced at opposite sides of the axis of rotation of the backing plate, means associated with the chuck jaws engageable with the respective pairs of scroll-like surfaces on the adjusting plate whereby relative rotation of the adjusting plate effects simultaneous movement of the chuck jaws in diametrically opposite directions.

4. A chuck construction of the character disclosed, in combination, a rotatable shaft formed with a backing plate, a circular housing member, adjustable means for adjusting the position of said housing member with respect to the backing plate, means for securing the annular member in adjusted position to the backing plate, a pair of chuck jaws, guide means for said chuck jaws associated with the housing member, said guide means including guide plates arranged to form guide ways for said chuck jaws, a chuck jaw adjusting plate arranged for rotative movement relative to the backing plate, said adjusting plate being formed with pairs of scroll-like surfaces generated about axes spaced at each side of the axis of rotation of the backing plate, means associated with the chuck jaws engageable with the respective pairs of scroll-like surfaces on the adjusting plate whereby relative rotation of the adjusting plate effects simultaneous movement of the chuck jaws in diametrically opposed directions, and work engaging blocks removably secured to the chuck jaws.

5. A chuck construction of the character disclosed, in combination, a rotatable backing plate, a circular housing member carried by the backing plate, a pair of diametrically arranged chuck jaws, guide members for the chuck jaws, means retaining the chuck jaw guide members in the housing member, a rotatable chuck jaw adjusting plate in said housing member, said adjusting plate being formed with two pairs of curved surfaces, each pair of surfaces being generated about different centers spaced at each side of the center of rotation of the backing plate, means associated with the chuck jaws and in engagement with the respective pairs of curved surfaces formed on the adjusting plate whereby rotation of the adjusting plate effects simultaneous radial movement of the chuck jaws, means for rotating the adjusting plate, and a plurality of screws engageable with the housing member and backing plate for laterally adjusting the housing member with respect to the axis of the rotatable backing plate.

6. A chuck construction of the character disclosed, in combination, a rotatable shaft provided with a flange forming a backing plate, a circular housing, means for securing the housing to the backing plate, a pair of diametrically arranged chuck jaws, a pair of guide members for said chuck jaws having portions within and supported by the circular housing, one of said guide members being adjustable relative to the other, a chuck jaw adjusting plate supported for rotation within the housing and adjacent the backing plate, said adjusting plate having teeth formed in a peripheral region thereof, a pinion journally supported within the housing enmeshed with the teeth formed on the adjusting plate, said adjusting plate being formed with a pair of scroll-like slots generated about different centers, each of said chuck jaws having a bore formed therein, pins extending into the respective bores in the chuck jaws, said pins having head portions extending into the respective scroll slots in the adjusting plate, and means for adjusting the assemblage of housing, adjusting plate, chuck jaw guide members and chuck jaws relative to the backing plate.

7. A chuck construction of the character disclosed, in combination, a rotatable shaft provided with a flange forming a backing plate, a circular housing, means for securing the housing to the backing plate, a pair of chuck jaws, a pair of segment-shaped guide members for said chuck jaws having portions within the circular housing, at least one of said chuck jaw guide members being adjustable relative to the housing, a chuck jaw adjusting plate supported for rotation within the housing and adjacent the backing plate, a retainer for securing the chuck jaw adjusting plate adjacent the backing plate, said adjusting plate having teeth formed in a peripheral region thereof, a pinion journally supported within the housing enmeshed with the teeth formed on the adjusting plate, said adjusting plate being formed with a pair of scroll-like slots generated about different centers, each of said chuck jaws having a bore formed therein, pins extending into the respective bores in the chuck jaws, said pins having head portions extending into the respective scroll slots in the adjusting plate, said pinion being accessible exteriorly of the housing and formed with means to receive a tool to effect rotation of the pinion and adjusting plate to move the chuck jaws toward or away from each other, and means for adjusting the assemblage of housing, adjusting plate, chuck jaw guide members and chuck jaws relative to the backing plate.

8. A chuck construction of the character disclosed, in combination, a rotatable shaft having a flange forming a backing plate, a circular housing, a pair of diametrically arranged chuck jaws embraced by the housing, a pair of segment-shaped chuck jaw guide means in said housing, said chuck jaw guide means including hardened wear plates arranged to be slidably engaged by the chuck jaws, an adjusting plate supported for rotation within the housing, said adjusting plate being formed with a pair of scroll-like slots generated about centers spaced from the center of rotation of the rotatable shaft, a pin for each chuck jaw extending into a bore in the chuck jaw and having a portion engaged in a scroll slot in the adjusting plate, a plurality of recesses formed in the adjusting plate providing a plurality of teeth, a pinion journally supported by the housing and enmeshed with the teeth on the adjusting plate, and a plurality of circumferentially spaced screws having portions engaging the backing plate and the housing for adjusting the position of the housing and chuck jaws relative to the backing plate.

9. A chuck construction of the character disclosed, in combination, a rotatable shaft having a flange forming a backing plate, a circular housing, a pair of diametrically arranged chuck jaws embraced by the housing, a pair of segment-shaped chuck cheeks in said housing, means for adjusting at least one of said chuck cheeks relative to the housing, hardened wear plates secured to said chuck cheeks and arranged to be slidably engaged by the chuck jaws, an adjusting plate supported for rotation within the housing, said adjusting plate being formed with a pair of scroll-like slots generated about centers spaced from the center of rotation of the rotatable shaft, a pin for each chuck jaw extending into a bore in the chuck jaw, each of said pins having a generally rectangularly shaped portion engaged in a scroll slot in the adjusting plate, a plurality of recesses formed in the adjusting plate providing a plurality of teeth, a pinion journally supported by the housing and enmeshed with the teeth on the adjusting plate, a plurality of circumferentially spaced screws having portions engaging the backing plate and the housing for adjusting the position of the housing and chuck jaws relative to the backing plate, means engagable with the housing and backing plate for locking the housing in adjusted position relative to the backing plate, and removable work engaging inserts carried by the chuck jaws.

References Cited in the file of this patent

UNITED STATES PATENTS

| 1,838,714 | Stevens | Dec. 29, 1931 |
| 2,847,226 | Sloan | Aug. 12, 1958 |
| 2,898,120 | Goepfrich | Aug. 4, 1959 |